United States Patent [19]
Kobayashi et al.

[11] Patent Number: 6,014,248
[45] Date of Patent: Jan. 11, 2000

[54] WAVELENGTH DIVISION MULTIPLEXED OPTICAL SIGNAL AMPLIFIER

[75] Inventors: Taiki Kobayashi; Tadashi Okiyama; Shinya Inagaki, all of Kawasaki, Japan

[73] Assignee: Fujitsu Limited, Kawasaki, Japan

[21] Appl. No.: 09/049,090

[22] Filed: Mar. 27, 1998

[30] Foreign Application Priority Data

Oct. 17, 1997 [JP] Japan ............................. 9-285641

[51] Int. Cl.[7] ............................... H01S 3/00; H04J 14/02
[52] U.S. Cl. .................................. 359/341; 359/133
[58] Field of Search ........................ 359/341, 124, 359/133, 134

[56] References Cited

U.S. PATENT DOCUMENTS

| | | | |
|---|---|---|---|
| 5,305,134 | 4/1994 | Tsushima et al. | 359/192 |
| 5,923,450 | 7/1999 | Dugan et al. | 359/127 |
| 5,933,552 | 8/1999 | Fukushima et al. | 385/24 |

*Primary Examiner*—Mark Hellner
*Attorney, Agent, or Firm*—Staas & Halsey

[57] ABSTRACT

A wavelength division multiplexed (WDM) optical signal amplifier which amplifies optical signals having different wavelengths with minimized deviations in their respective output power levels, while maintaining the total optical output at a constant power level. An optical splitter, disposed at the output of the amplifier, splits off a fraction of the amplified WDM optical output signal for feedback purposes. This WDM optical feedback signal is subjected to a wavelength division demultiplexer, where the optical components contained in the signal are demultiplexed into separate optical feedback signals each having a different wavelength. A plurality of optical power level detectors detect the optical power levels of the individual optical feedback signals. Based on the detected optical power levels, a controller adjusts the individual output power levels of the plurality of electrical-to-optical converters, so that the optical power levels detected by the optical power level detectors will coincide with each other.

5 Claims, 4 Drawing Sheets

WAVELENGTH DIVISION MULTIPLEXED OPTICAL SIGNAL AMPLIFIER

BACKGROUND OF THE INVENTION

1. Field of the Invention

The present invention relates to wavelength division multiplexed (WDM) optical signal amplifiers, and more particularly, to a WDM optical signal amplifier that maintains its optical output power at a constant level.

2. Description of the Related Art

As a way of amplifying optical transmission signals, optical amplifiers have become a reality in recent years, which operate entirely in the optical domain and do not employ any translation of data back to electrical baseband signals. Optical amplifiers include optical fiber amplifiers which boost optical signals by using a special optical fiber doped with rare-earth elements such as Erbium. Semiconductor laser amplifiers having a semiconductor-laser-based structure are another type of optical amplifiers, which are pumped by an appropriate amount of injection current set below the threshold point.

In general, optical amplifiers can be used for the amplification of WDM optical signals. In other words, they can amplify, at a time, two or more optical signals each having a different wavelength.

Optical amplifiers often employ an output feedback control mechanism to regulate their optical output at a constant power level. In optical fiber amplifiers, this feedback control is accomplished by varying the power of pumping light beams according to the actual output power level. In semiconductor laser amplifiers, on the other hand, the injection current is manipulated to control the output power level. Such feedback control mechanisms successfully provide a well-regulated optical signal output when the signal being amplified contains only a single wavelength component.

However, when the signal consists of two or more optical components each having a different wavelength, the above-described feedback control is of no help in reducing the variation in power levels among the different wavelength components contained in the optical output signal. The amplifier may seem to keep its output at a constant power level. In reality, however, it is only regulating the total output power level, but not the levels of individual signal components contained in the optical output signal, and therefore, the optical signal components with different wavelengths would exhibit different signal strengths. It is noted here that the optical amplifiers are required to have a flat response to different wavelengths.

SUMMARY OF THE INVENTION

Taking the above into consideration, an object of the present invention is to provide a wavelength division multiplexed optical signal amplifier for amplifying optical signals having different wavelengths with minimized variations in their output power levels.

To accomplish the above object, according to the present invention, there is provided a wavelength division multiplexed (WDM) optical signal amplifier which maintains an optical output power level thereof at a constant level.

This optical amplifier comprises: a plurality of electrical-to-optical converters, each having an output power level that is controllable, for converting given electrical signals to optical signals; a wavelength division multiplexer which produces a WDM optical signal by multiplexing the optical signals supplied from the plurality of electrical-to-optical converters; an optical amplifier which amplifies the WDM optical signal supplied from the wavelength division multiplexer, collectively for all different wavelength components contained therein; an optical splitter which splits a WDM feedback optical signal off from the WDM optical signal supplied from the optical amplifier; a wavelength division demultiplexer which produces a plurality of optical feedback signals having different wavelengths by demultiplexing the WDM optical feedback signal supplied from the optical splitter; a plurality of optical power level detectors which detect the optical power levels of the individual optical feedback signals having different wavelengths which are obtained by the wavelength division demultiplexer; and a controller which controls the individual output power levels of the plurality of electrical-to-optical converters so that the optical power levels detected by the plurality of optical power level detectors will coincide with each other.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
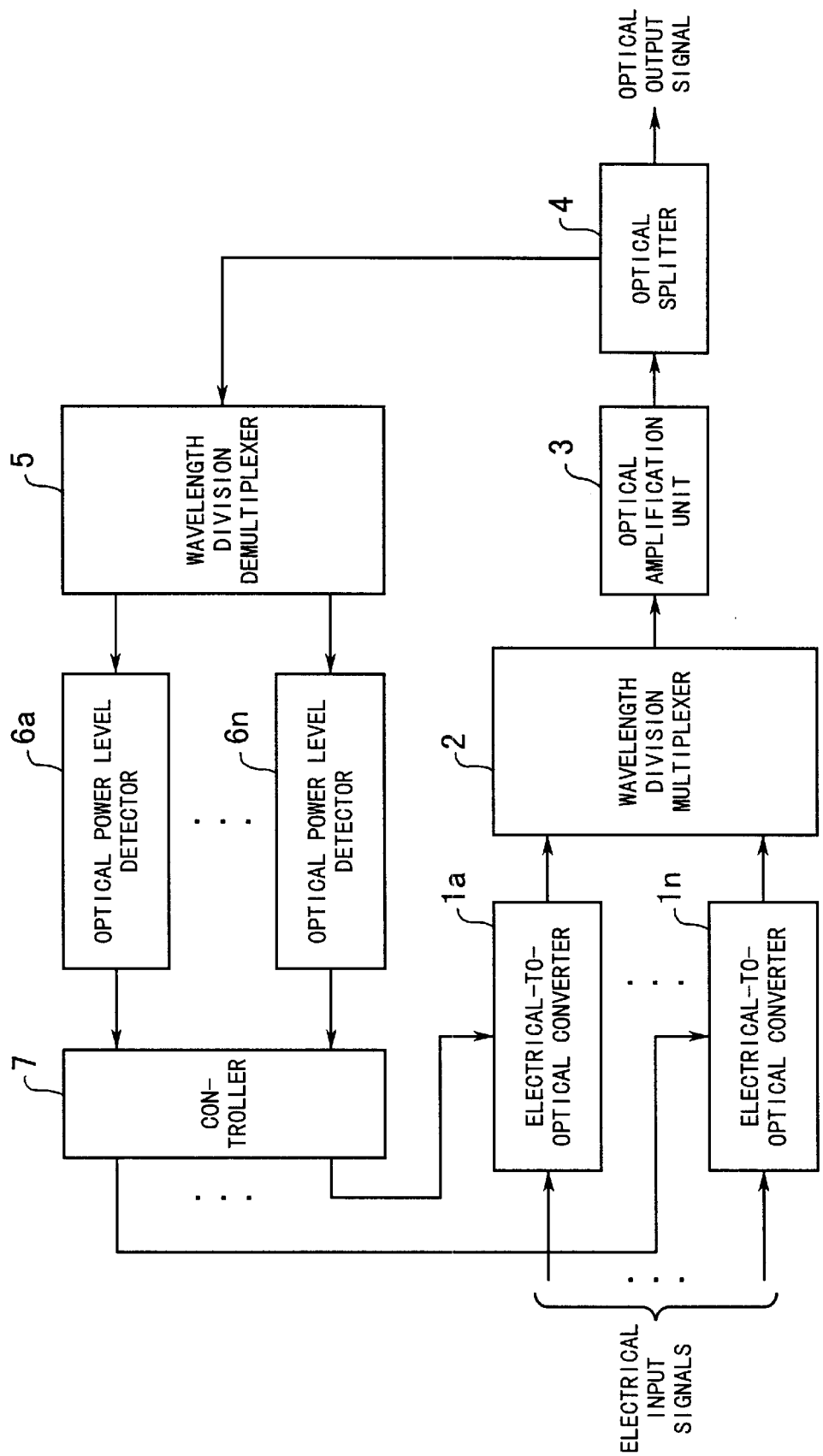
FIG. 1 is a conceptual view of the present invention.

Several embodiments of a wavelength division multiplexed optical signal amplifier according to the present invention will be described below with reference to the accompanying drawings. Referring first to FIG. 1, the following section will present the concept of the first embodiment of the present invention.

As FIG. 1 shows, the optical signal amplifier of the first embodiment comprises the following elements:

(a) a plurality of electrical-to-optical converters 1a to 1n, each having an output power level that is controllable, for converting given electrical signals to optical signals;

(b) a wavelength division multiplexer 2 which produces a WDM optical signal by multiplexing the optical signals supplied from the plurality of electrical-to-optical converters 1a to 1n;

(c) an optical amplification unit 3 which amplifies the WDM optical signal supplied from the wavelength division multiplexer 2, collectively for all different wavelength components contained therein;

(d) an optical splitter 4 which splits a WDM feedback optical signal off from the WDM optical signal supplied from the optical amplification unit 3;

(e) a wavelength division demultiplexer 5 which produces a plurality of optical feedback signals having different wavelengths by demultiplexing the WDM optical feedback signal supplied from the optical splitter 4;

(f) a plurality of optical power level detectors 6a to 6n which detect the optical power levels of the individual optical feedback signals having different wavelengths which are obtained by the wavelength division demultiplexer 5; and (g) a controller 7 which controls the individual output power levels of the plurality of electrical-to-optical converters 1a to 1n so that the optical power levels detected by the plurality of optical power level detectors 6a to 6n will coincide with each other.

In the above-described structural arrangement, the main traffic signal flows as follows. First, the electrical-to-optical converters 1a to 1n convert a plurality of given electrical signals into corresponding optical signals and sends them to the wavelength division multiplexer 2. Next, the wavelength division multiplexer 2 combines these optical signals with different wavelengths into a single WDM optical signal and supplies it to the optical amplification unit 3. Then the optical amplification unit 3 amplifies the WDM optical signal in the optical domain, and outputs it to the next stage.

In contrast to the main traffic signal flow described above, the control signals will be processed and propagated in the following way. First, part of the WDM optical signal amplified by the optical amplification unit 3 is split off at the optical splitter 4 for feedback purposes. This WDM optical feedback signal branching out at the optical splitter 4 is then subjected to the wavelength division demultiplexer 5, in which the components of the signal are demultiplexed into separate optical signals having different wavelengths. The optical power level detectors 6a to 6n receive these separate optical signals and detect their respective optical power levels. On the basis of the optical power levels detected, the controller 7 adjusts the output power levels of the individual electrical-to-optical converters 1a to 1n, so that the optical power levels detected by the optical power level detectors 6a to 6n will be equal to each other. In this way, the amplified WDM optical signal obtained from the optical amplification unit 3 will contain the component signals with equal optical levels, meeting the requirements of later stages in the optical communications system (not illustrated).

Now, the next section will explain the details of the first embodiment outlined above.

Figure 2:
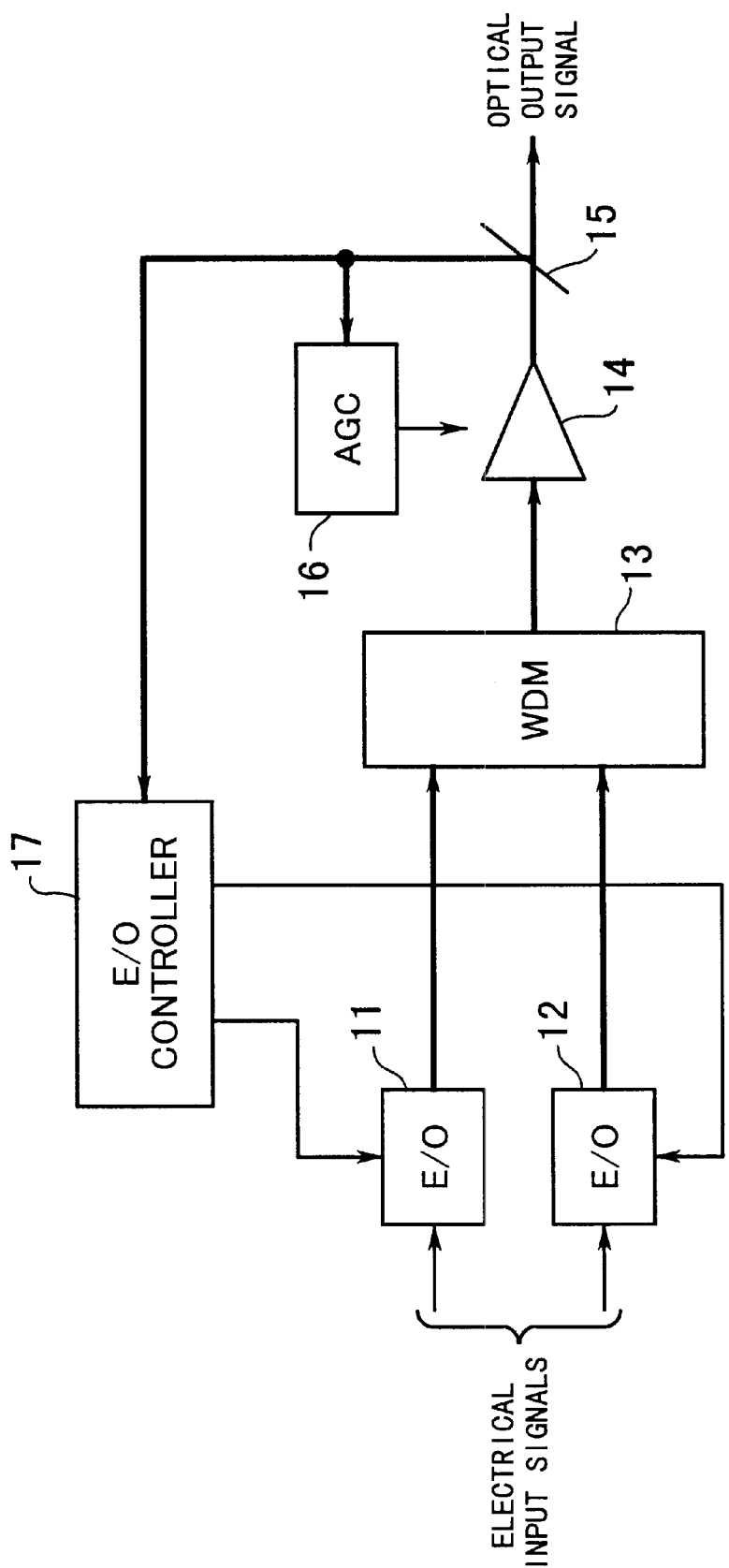
FIG. 2 is a diagram which shows the configuration of a WDM optical signal amplifier according to a first embodiment of the present invention.

FIG. 2 is a block diagram of a WDM optical signal amplifier according to the first embodiment of the present invention. This amplifier is configured to multiplex and amplify two optical signals each having a different wavelength. Note that, in FIG. 2, the thick arrows indicate the optical signal flow, while thin arrows represent the electrical signal flow.

FIG. 2 illustrates two electrical-to-optical converters (E/O) 11 and 12 which receive electrical input signals as the components of a main traffic signal, and converts them into optical signals. These electrical-to-optical converters 11 and 12 consist of semiconductor laser devices (laser diodes) and their driver circuits, whose output power levels are controlled by an E/O controller 17 independently of each other through separate control signals as described later. A wavelength division multiplexer 13 combines the two optical signals produced by the electrical-to-optical converters 11 and 12 into a single light beam, which is referred to as a WDM optical signal. This WDM optical signal is then fed to an optical amplification unit 14. The optical amplification unit 14 amplifies the signal entirely in the optical domain, thereby boosting the two component signals together. Preferably, the optical amplification unit 14 is an optical fiber amplifier or a semiconductor laser amplifier, whose output power level can be controlled by varying the amount of pumping light or injection current supplied to the amplifier device. As will be described later, an automatic gain controller 16 is employed to regulate the optical amplification unit 14's output level.

The WDM optical signal amplified by the optical amplification unit 14 is sent out, as the main traffic signal, to later stages through an optical fiber (not illustrated in FIG. 2). A beam splitter 15 is disposed on this signal path to split off a fraction of the amplified WDM optical signal. The WDM optical signal having branched from the main traffic signal is entered to an electrical-to-optical conversion (E/O) controller 17 so that the two different wavelength components supplied to the optical amplification unit 14 will equally have a constant optical power level. The WDM optical signal having branched from the main traffic signal is supplied also to the automatic gain controller (AGC) 16 mentioned above. This automatic gain controller 16 detects the optical power level of the received WDM optical signal, and on the basis of the detected power level, it regulates the gain of the optical amplification unit 14. In the case that an optical fiber amplifier is employed as the optical amplification unit 14, this gain control is accomplished by varying the power of its pumping light according to the detected power level. In the case that a semiconductor laser amplifier is employed as the optical amplification unit 14, the injection current is varied to control its output power level.

The E/O controller 17, on the other hand, demultiplexes the WDM optical feedback signal, which has branched off at the beam splitter 15, into two separate optical signals having different wavelengths. The E/O controller 17 detects their respective optical power levels and controls the electrical-to-optical converters 11 and 12 according to the detected values. This control actually manipulates a bias current fed to each semiconductor laser device integrated in the electrical-to-optical converters 11 and 12, in such a way that the two optical signals entered to the optical amplification unit 14 as the components of the WDM optical signal will have equal optical power levels.

Figure 3:
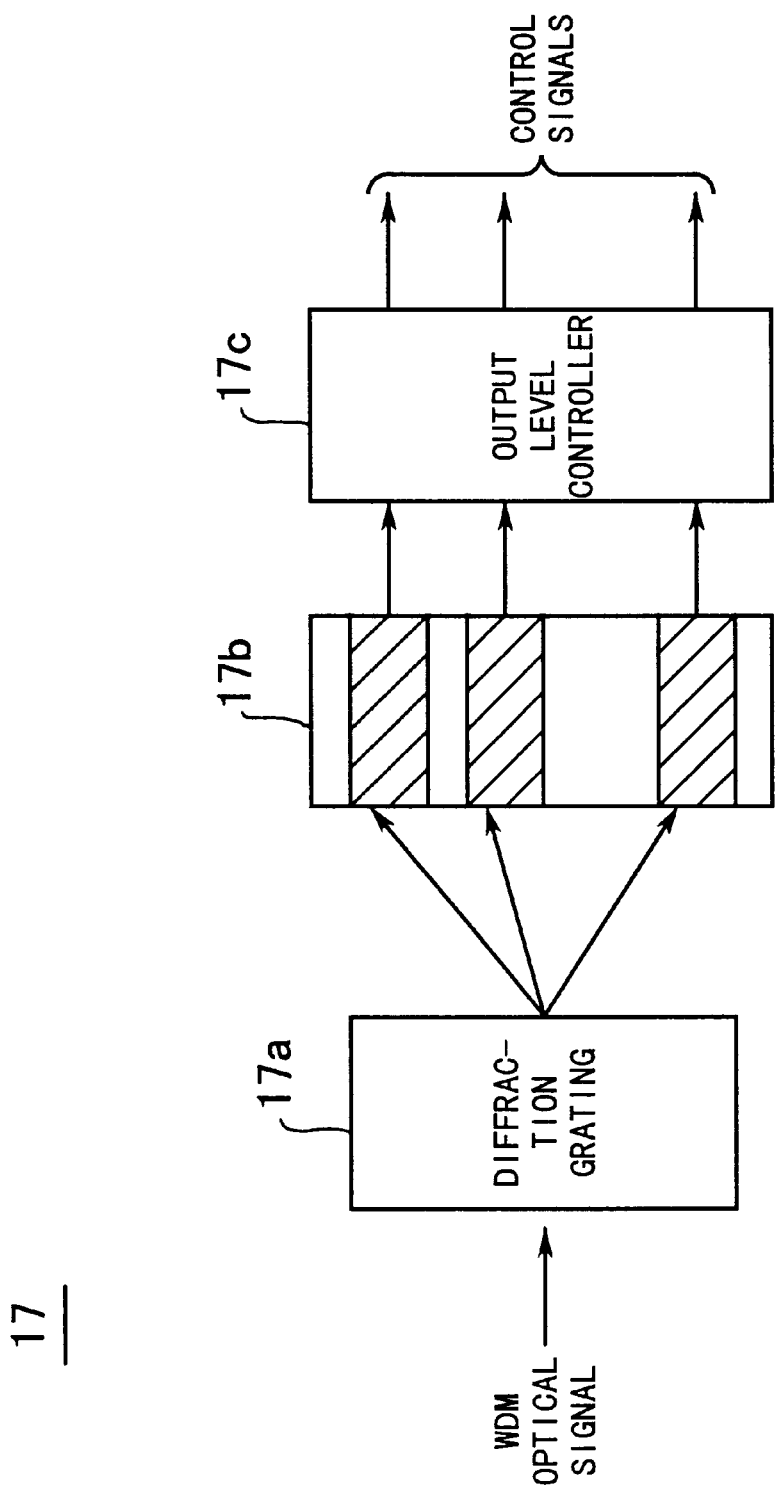
FIG. 3 is a diagram which shows the internal structure of an E/O controller.

FIG. 3 is a diagram showing the internal structure of the E/O controller 17. The E/O controller 17 employs a diffraction grating 17a to divide the incoming WDM optical signal into different wavelength components. The divided optical signals are fed to a charge-coupled device (CCD) array 17b. Here, the CCD array 17b produces voltage signals proportional to the optical signals' individual power levels and sends them to the output level controller 17c. On the basis of the received voltage signals, the output level controller 17c generates appropriate control signals to adjust the power levels of the optical signals produced by the electrical-to-optical converters 11 and 12. These control signals, which are fed to the electrical-to-optical converters 11 and 12, are determined so that the voltage signals produced by the CCD array 17b will exhibit the same voltage values.

The above-described first embodiment of the present invention has illustrated a specific WDM optical amplifier that combines and amplifies two optical signals with different wavelengths. The present invention, however, is not restricted to this specific number of optical signals, but can be applied to other configurations capable of amplifying more than two optical signals having different wavelengths.

Further, the configuration depicted in FIG. 3 is only an example of the E/O controller 17. The essential functions of this E/O controller 17 are: (a) to demultiplex a given WDM optical feedback signal into separate optical signals having different wavelengths, (b) to detect their respective optical power levels, and (c) to control the electrical-to-optical converters 11 and 12 according to the detected values. It is of course possible to implement the E/O controller 17 differently from FIG. 3, as long as it provides the essential functions summarized above.

Figure 4:
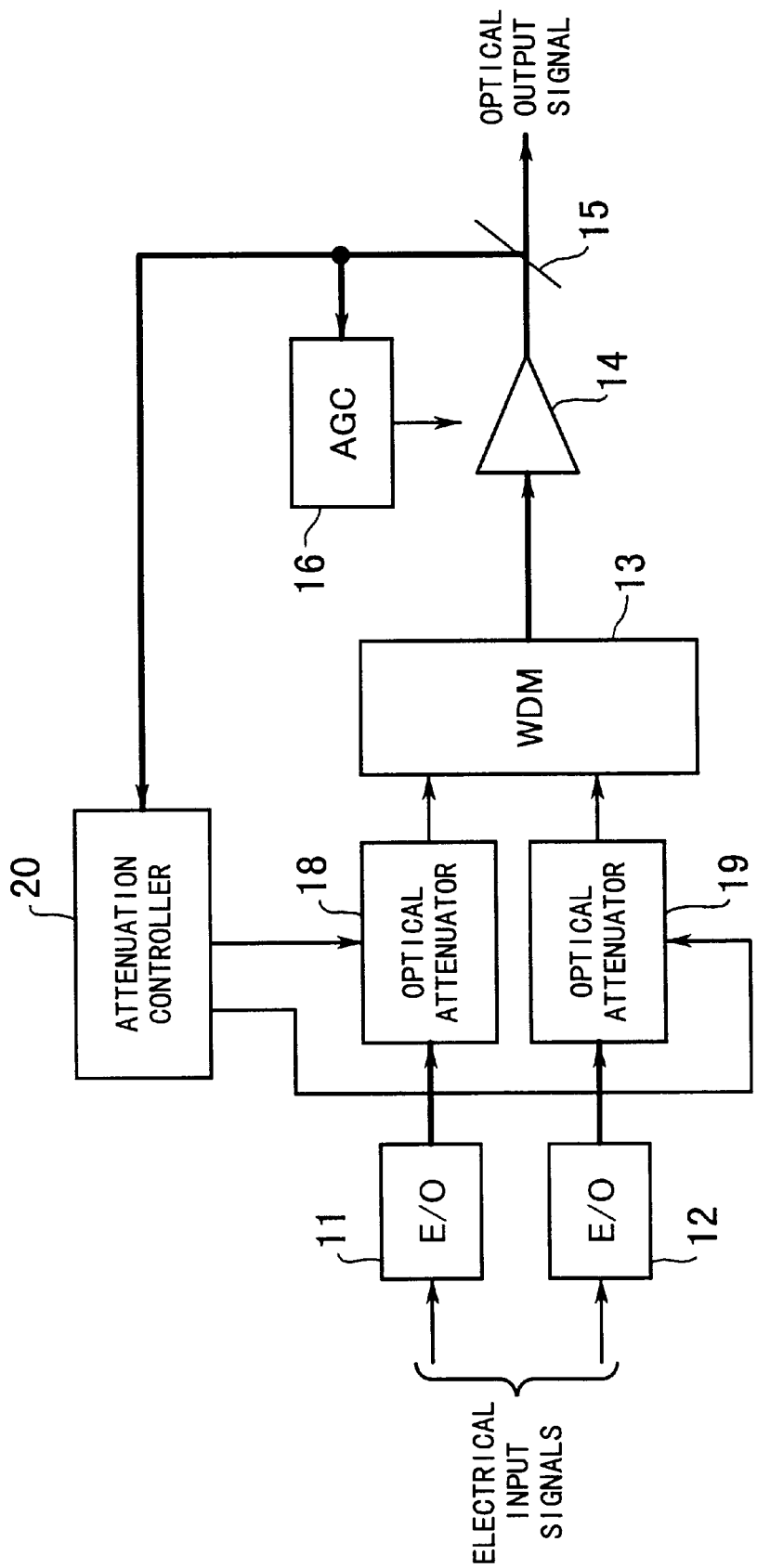
FIG. 4 is a block diagram of a second embodiment of the present invention.

Referring now to FIG. 4, the next section will explain a second embodiment of the present invention. Since this second embodiment has basically the same structure as that of the first embodiment, the following section will focus on its distinctive points, while affixing like reference numerals to like elements.

In the second embodiment, optical attenuators 18 and 19 are newly disposed between the electrical-to-optical converters 11 and 12 and the wavelength division multiplexer 13. These optical attenuators 18 and 19 reduce the power levels of the optical signals produced by the electrical-to-optical converter 11 and 12. The optical attenuators 18 and 19 have control signal inputs which determine the degree of attenuation on an individual basis. Such control signals are supplied from an attenuation controller 20, which works similarly to the E/O controller 17 appeared in the first embodiment. More specifically, the attenuation controller 20 demultiplexes the WDM optical feedback signal, which has branched off at the beam splitter 15, into two separate optical signals having different wavelengths, detects their respective optical power levels, and controls the optical attenuator 18 and 19 according to the detected values. This attenuation control actually manipulates the attenuation ratios of the optical attenuators 18 and 19, in such a way that the two optical signals supplied to the optical amplification unit 14 as the components of the WDM optical signal will have equal optical power levels. Unlike the first embodiment, the second embodiment does not require the electrical-to-optical converters 11 and 12 to have a capability of varying their output power levels.

The above discussion is summarized as follows. According to the present invention, a wavelength division demultiplexer reproduces a plurality of optical signals having different wavelengths by demultiplexing a part of the WDM optical signal amplified by an optical amplification unit. A plurality of optical power level detectors detect the optical power levels of the individual optical signals. Based on the detected optical power levels, a controller adjusts the individual output power levels of the plurality of electrical-to-optical converters, so that the optical power levels detected by the plurality of optical power level detectors will coincide with each other. As a result, the component signals contained in the WDM optical output signal of the optical amplification unit will exhibit reduced variations in their optical power levels, thus meeting the requirements of later stages in the optical communications system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wavelength division multiplexed (WDM) optical signal amplifier which maintains an optical output power level thereof at a constant level, comprising:

a plurality of electrical-to-optical conversion means, each having an output power level that is controllable, for converting given electrical signals to optical signals;

wavelength division multiplexing means for producing a WDM optical signal by multiplexing the optical signals supplied from said plurality of electrical-to-optical conversion means;

optical amplification means for amplifying the WDM optical signal supplied from said wavelength division multiplexing means, collectively for all different wavelength components contained therein;

optical splitting means for splitting a WDM feedback optical signal off from the WDM optical signal supplied from said optical amplification means;

wavelength division demultiplexing means for producing a plurality of optical feedback signals having different wavelengths by demultiplexing the WDM optical feedback signal supplied from said optical splitting means;

a plurality of optical power level detection means for detecting optical power levels of the individual optical feedback signals having different wavelengths which are obtained by said wavelength division demultiplexing means; and control means for controlling the individual output power levels of said plurality of electrical-to-optical conversion means so that the optical power levels detected by said plurality of optical power level detection means will coincide with each other.

2. The wavelength division multiplexed optical signal amplifier according to claim 1, wherein said optical amplification means is an optical fiber amplifier.

3. The wavelength division multiplexed optical signal amplifier according to claim 1, wherein said optical amplification means is a semiconductor laser amplifier.

4. The wavelength division multiplexed optical signal amplifier according to claim 1, wherein different wavelength components contained in the WDM optical signal produced by said optical amplification means will exhibit reduced variations in output power levels thereof by controlling, on the basis of the WDM optical feedback signal split off by said optical splitting means, the WDM optical signal entered to said optical amplification means to have a constant power level, and also by controlling said optical amplification means to have a constant gain.

5. A wavelength division multiplexed (WDM) optical signal amplifier which maintains an optical output power level thereof at a constant level, comprising:

a plurality of electrical-to-optical conversion means for converting given electrical signals to optical signals;

a plurality of optical power level attenuation means, each having an attenuation ratio that is controllable, for attenuating optical power levels of the individual optical signals supplied from said plurality of electrical-to-optical conversion means;

wavelength division multiplexing means for producing a WDM optical signal by multiplexing the optical signals supplied from said plurality of optical power level attenuation means;

optical amplification means for amplifying the WDM optical signal supplied from said wavelength division multiplexing means, collectively for all different wavelength components contained therein;

optical splitting means for splitting a WDM feedback optical signal off from the WDM optical signal amplified by said optical amplification means;

wavelength division demultiplexing means for producing a plurality of optical feedback signals having different wavelengths by demultiplexing the WDM optical feedback signal split off by said optical splitting means;

a plurality of optical power level detection means for detecting optical power levels of the individual optical feedback signals having different wavelengths which are obtained by said wavelength division demultiplexing means; and control means for individually controlling the attenuation ratios of said plurality of optical power level attenuation means so that the optical power levels detected by said plurality of optical power level detection means will coincide with each other.

* * * * *